United States Patent
Minnick, Jr.

[15] 3,657,992
[45] Apr. 25, 1972

[54] VEHICLE CAB VENTILATOR
[72] Inventor: Donald F. Minnick, Jr., Hamburg, N.Y.
[73] Assignee: Thermal Components, Inc., Buffalo, N.Y.
[22] Filed: Sept. 2, 1970
[21] Appl. No.: 68,970

[52] U.S. Cl...............................................98/2.11, 55/487
[51] Int. Cl............................................................B60h 1/24
[58] Field of Search ......................98/2.00, 2.11, 2.14, 2.15; 55/487, 416, 385

[56] References Cited

UNITED STATES PATENTS

| | | |
|---|---|---|
| 3,472,147 | 10/1969 | Grasseler..............................98/2.11 |
| 2,537,278 | 1/1951 | Patterson..............................98/2.11 |
| 3,372,911 | 3/1968 | Herboldsheimer....................98/2.11 |
| 2,146,071 | 2/1939 | Horvath....................................55/487 |

Primary Examiner—Meyer Perlin
Attorney—Bean & Bean

[57] ABSTRACT

A ventilator unit to be affixed to the roof of a vehicle cab characterized as having a flat prefilter, a bag filter, an activated charcoal filter and filtered air discharge fans serially arranged within a horizontally elongated casing; the fans discharging downwardly through openings in the cab roof onto a distribution plate. The distribution plate cooperates with the roof to define a clean air plenum chamber from which air is distributed about the side walls of the cab.

6 Claims, 4 Drawing Figures

PATENTED APR 25 1972 3,657,992

INVENTOR.
DONALD F. MINNICK JR.
BY
Bean & Bean
ATTORNEYS 3,657,992

VEHICLE CAB VENTILATOR

SUMMARY OF THE INVENTION

The present invention relates to ventilators and more particularly to ventilator units of the type adapted for mounting on the operator's cab of an agricultural vehicle, such as a tractor.

The ventilator unit of the present invention is particularly adapted for use in protecting a vehicle operator against concentrations of dust and mist normally encountered during pesticide spraying operations. To this end, outside air contaminated with pesticides and other commonly encountered extraneous materials is subjected to a three step filtering operation to provide pollutant free air, which is passed under pressure into the vehicle cab in order to prevent the entrance of unfiltered air. The filtered or freshened air admitted to the cab additionally provides natural cooling for the vehicle operator.

The present ventilator unit is in the form of a horizontally elongated casing or housing, which may be quickly affixed to the roof of a cab by generally L-shaped mounting brackets or plates; the housing having a screened, ambient air inlet opening provided in one end wall and a filtered air discharge opening arranged in a bottom wall adjacent an opposite end of the casing. A prefilter, a bag filter, an activated carbon filter and a filtered air discharge fan or fans are serially arranged intermediate the inlet and discharge openings; the fans having discharge ducts extending downwardly through the discharge opening and an aligned opening in the cab roof for directing filtered air under pressure into engagement with an air distributing plate suspended immediately below the cab roof. The air distributing plate cooperates with the cab roof to define a clean air plenum chamber from which air is distributed about the side walls of the cab.

DRAWINGS

The nature and mode of the present invention will be more fully described in the following detailed description taken with the accompanying drawings wherein.

DETAILED DESCRIPTION

Figure 1:
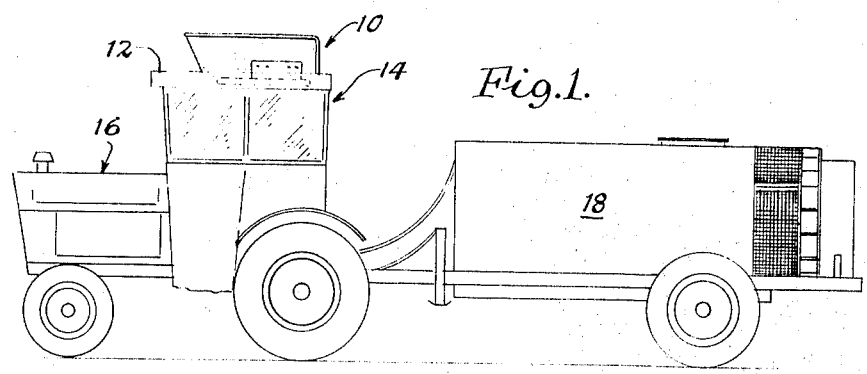
FIG. 1 is a side elevational view showing the ventilator unit of the present invention mounted on the cabe of an agricultural vehicle.

To facilitate understanding of the present invention, reference is first made to FIG. 1, wherein the ventilator unit of the present invention is generally designated as 10 and shown as being mounted on the roof 12 of a suitable cab or enclosure 14 of a vehicle, such as a farm tractor 16. As will hereinafter become apparent, unit 10 is particularly adapted for use in supplying clean, filtered air to cab 14, when tractor 16 is employed to draw an insecticide dispensing vehicle 18 through a field, orchard or the like.

Figure 2:
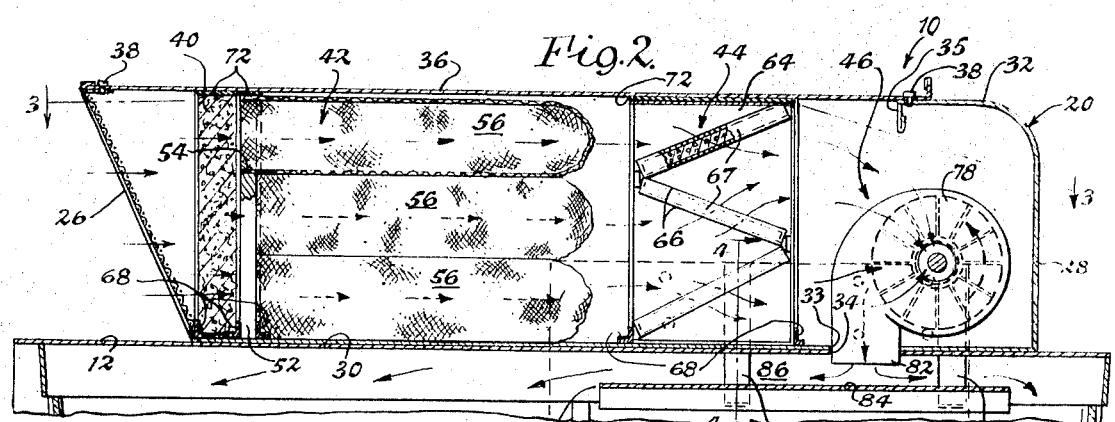
FIG. 2 is a vertical, sectional view of the ventilator unit.
Figure 3:
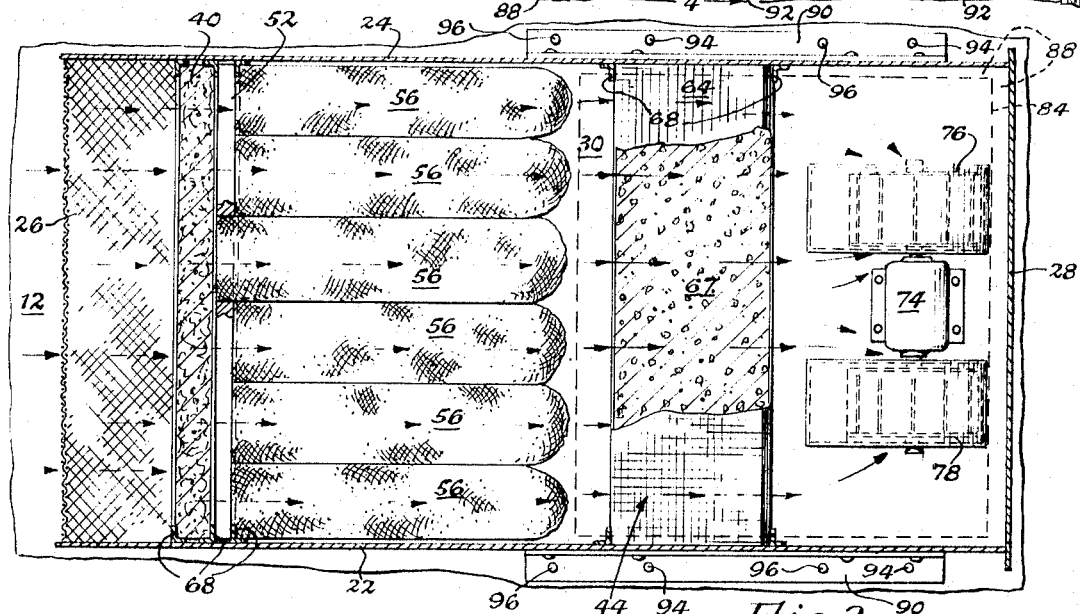
FIG. 3 is a sectional view taken generally along line 3—3 in FIG. 2.

Now referring particularly to FIGS. 2 and 3, it will be seen that ventilator unit 10 includes a horizontally elongated casing 20 of generally rectangular cross section, which is defined by side walls 22 and 24, end walls 26 and 28, a bottom wall 30 and top wall 32. End wall 26, which is preferably defined by a screen element, defines an ambient air inlet opening to casing 20, whereas bottom wall 30 is provided with an opening 33, which forms an air outlet or discharge opening from the casing to be arranged for alignment with an opening 34 formed in roof 12. Preferably, top wall 32 is provided with an expansive opening 35, which is normally closed by top panel section 36. As shown in FIG. 2, panel section 36 may be removably fixed to casing 20, as by machine screw devices 38. Casing walls 22—32 are preferably formed of metal and joined together, as by welding.

Serially mounted within casing 20 intermediate the air inlet and outlet openings thereof are prefilter device 40, such as a glass fiber pad or mat; bag filter device 42; and activated charcoal filter device 44; and a fan device 46.

Bag filter device 42 is shown as being in the form of a cartridge frame 52 having a plurality of through openings 54 in alignment with each of which is mounted a collapsible filter bag 56. Filter bags 56 may be formed of any suitable filtering media, such as glass fiber or mixtures of various fibers including cotton and synthetic materials.

Activated charcoal filter device 44 is shown as being in the form of a box frame 64 whose facing side walls carry guide channels 66 arranged to slidably receive cartridges 67 charged with activated charcoal and/or other suitable air purifying compounds.

Prefilter device 40, cartridge frame 52 and box frame 64 may be positionally supported within and sealed relative to casing walls 22, 24 and 30 by casing wall affixed L-shaped bracket 68. Panel section 36 may be removably sealed relative to casing 10 by a continuous sealing gasket, not shown, and relative to filter devices 40–44 by sealing gaskets 72. Filter devices 40–44 may be removed from casing 10 for either maintenance or replacement purposes by merely removing panel 36 and thereafter lifting the filter devices upwardly through opening 35.

Figure 4:
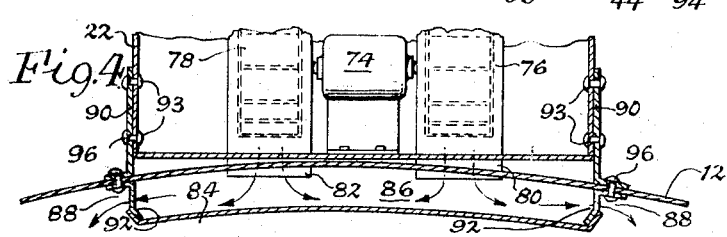
FIG. 4 is a sectional view taken generally along line 4—4 in FIG. 2.

Fan device 26 is shown in FIGS. 2–4 as including an electrically operated motor 74 arranged to drive a pair of fans 76, 78. Electric power for operated motor 74 may be drawn from the electrical system of the vehicle, as desired. As best shown in FIGS. 2 and 4, the casing outlet ducts 80, 82 of fans 76, 78, are arranged to extend downwardly through casing bottom wall opening 33 and roof opening 34 when aligned. Outlet ducts 80, 82 are outwardly air sealed relative to bottom wall 30 and roof 12 either by friction fitting same within openings 33, 34 or by suitable sealing gaskets, not shown.

Ventilator unit 10 additionally includes a deflector plate 84, which is suspended beneath and substantially conforms to the contour of roof 12. Plate 84 cooperates with roof 12 to form a plenum chamber 86 into which filtered air under pressure is supplied by fans 76, 78. It will be understood that deflector plate serves to prevent air from being blown directly down upon the head or shoulders of an operator when normally seated within cab 14. Further, the marginal edges of the deflector plate cooperate with the roof to define openings 88 through which filtered air is directed about the side walls of the cab. As will be apparent, air introduced into the cab in this manner creates a pressure within the cab which is greater than atmospheric and thereby serves to effectively prevent entrance of non-filtered or contaminated air thereinto.

Casing 20 and deflector plate 84 are preferably affixed to cab roof 12 by a pair of substantially L-shaped mounting brackets 90 and pairs of generally S-shaped mounting brackets 92, respectively. By viewing FIGS. 3 and 4, it will be understood that brackets 90, which are suitably fixed to casing side walls 22 and 24 by suitable fastener devices, such as bolts 93, are provided with a plurality of spaced apertures alignable with a corresponding number of apertures formed in roof 12. Casing 20 is preferably mounted on roof 12 by a procedure wherein fastener devices, such as bolts 94, are initially passed downwardly through the first and third aligned apertures from the front of the unit. Thereafter, suitable fastener devices, such as bolts 96, are passed downwardly through the second and fourth aligned apertures and apertured brackets 92 for the purpose of clamping both casing 20 and deflector plate 84 in mounted position.

While the ventilator unit of the present invention has been described with particular reference to its use during pesticide spraying operations, it will be understood that it additionally possesses utility when the vehicle is generally used for field work. In this latter case, the prefilter alone will normally be sufficient to provide a supply of adequately filtered air.

I claim:

1. A ventilator unit adapted for mounting on the roof of a vehicle cab having enclosing side wall portions, said unit comprising in combination:

a horizontally elongated casing, said casing having an ambient inlet opening adjacent one end thereof and an air outlet opening through a bottom wall of said casing adjacent in opposite end thereof;

means to mount said casing on said roof exteriorally of said cab, said roof having an opening in alignment with said air outlet opening;

a deflector plate;

means to suspend said deflector plate from said roof immediately below said aligned openings, said deflector plate being upwardly convex and having marginal edge portions thereof spaced from said cab side wall portions;

filter means arranged within said casing; and fan means arranged within said casing for drawing air successively through said inlet opening and said filter means and discharging air passing from said filter means vertically downwardly through said aligned openings against said deflector plate, said deflector plate cooperating with said roof to define a plenum chamber for receiving air passing through said aligned openings and outlets through which air is directed from said chamber towards said side wall portions of said cab for distribution within said cab.

2. A ventilator unit according to claim 1, wherein said fan means includes a fan casing, said fan casing having an outlet duct extending downwardly through said aligned openings in air sealed relationship relative to said casing bottom wall and said roof.

3. A ventilator unit adapted for mounting on the roof of a vehicle cab comprising in combination:

a horizontally elongated casing, said casing having an ambient inlet opening adjacent one end thereof and an air outlet opening through a bottom wall of said casing adjacent an opposite end thereof;

means to mount said casing on said roof exteriorally of said cab, said casing mounting means including a pair of L-shaped brackets fixed one bracket adjacent each side of said casing, each said bracket having a plurality of fastener device receiving apertures arranged for alignment with fastener device receiving apertures in said roof, said roof having an opening in alignment with said air outlet opening;

a deflector plate;

means to suspend said deflector plate from said roof immediately below said aligned openings, said deflector plate suspending means including plural pairs of brackets fixed to said deflector plate and having apertures arranged for alignment with certain of said aligned apertures, said casing being fixed to said roof by fastener devices passing downwardly through other of said aligned apertures and by fastener devices passing downwardly through said certain aligned apertures and said plate mounting bracket apertures, filter means arranged within said casing; and fan means arranged within said casing for drawing air successively through said inlet opening and said filter means and discharging air passing from said filter means downwardly into said cab through said aligned openings against said deflector plate, said deflector plate cooperating with said roof to define a plenum chamber from which air is distributed within said cab.

4. A ventilator unit adapted for mounting on the roof of a vehicle cab comprising in combination:

a horizontally elongated casing of generally rectangular cross-sectional configuration having a pair of end walls, a pair of side walls and top and bottom walls, one of said end walls defining an ambient inlet opening, said bottom wall defining an air outlet opening arranged adjacent another of said end walls, and said top wall defining an expansive access opening sealably closed by a removable top panel;

means to mount said casing on said roof exteriorally of said cab, said roof having an opening in alignment with said air outlet opening;

a deflector plate;

means to suspend said deflector plate from said roof immediately below said aligned openings;

filter means removably supported within said casing horizontally intermediate said inlet and outlet openings for removal through said expansive opening; and fan means arranged within said casing, said fan means including a fan casing having an outlet duct extending downwardly through said aligned openings in an air sealed relationship relative to said casing bottom wall and said roof, said fan means drawing air horizontally successively through said inlet opening and said filter means and discharging air passing from said filter means vertically downwardly through said cut into said cab against said deflector plate, and said deflector plate cooperating with said roof to define a plenum chamber from which air is distributed within said cab.

5. A ventilator unit according to claim 4, wherein said filter means includes a prefilter pad formed of fibrous materials, a plurality of fiber bags, and an activated charcoal filter, said pad, said bags and said charcoal filter being serially arranged within said casing.

6. A ventilator unit adapted for mounting on the roof of a vehicle cab having enclosing side wall portions, said unit comprising in combination:

a horizontally elongated casing, said casing having an ambient inlet opening defined by one screened end wall thereof, an air outlet opening through a bottom wall of said casing adjacent an opposite end wall thereof, an expansive access opening in a top wall thereof, said access opening being sealably closed by a removable top panel;

means to mount said casing on said roof exteriorally of said cab, said casing mounting means including a pair of L-shaped brackets fixed one bracket adjacent each side of said casing, each said bracket having a plurality of fastener device receiving apertures arranged for alignment with fastener device receiving apertures in said roof, said roof having an opening in alignment with said air outlet opening;

a deflector plate conforming to the contour of said roof and having marginal edges thereof spaced inwardly from said cab side wall portions;

means to suspend said deflector plate from said roof immediately below said aligned openings, said deflector plate suspending means including a plurality of pairs of brackets fixed to said deflector plate and having apertures arranged for alignment with certain of said aligned apertures, said casing being fixed to said roof by fastener devices passing downwardly through other of said aligned apertures and by fastener devices passing downwardly through said certain aligned openings and said plate mounting bracket apertures; filter means arranged within said casing for removal through said access opening; and fan means arranged within said casing for drawing air horizontally successively through said inlet opening and said filter means and discharging air passing from said filter means vertically downwardly through said aligned openings against said deflector plate, said deflector plate cooperating with said roof to define a plenum chamber receiving air passing through said aligned openings and outlets through which air is directed from said chamber towards said cab side wall portions.

* * * * *